US007133764B2

(12) United States Patent
Kassner

(10) Patent No.: US 7,133,764 B2
(45) Date of Patent: Nov. 7, 2006

(54) METHOD FOR DETERMINING THE ANGLE-OF-ROTATION POSITION OF A SHAFT

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/081,953

(22) Filed: Mar. 16, 2005

(65) Prior Publication Data

US 2005/0216177 A1 Sep. 29, 2005

(30) Foreign Application Priority Data

Mar. 26, 2004 (DE) ...................... 10 2004 015 037

(51) Int. Cl.
*F02D 45/00* (2006.01)
*G06G 19/00* (2006.01)
*F02N 17/00* (2006.01)
*G06G 7/70* (2006.01)
*G01M 15/06* (2006.01)

(52) U.S. Cl. ..................... 701/112; 701/114; 123/179.4

(58) Field of Classification Search ............. 123/179.3, 123/179.4, 406.58–406.65, 479, 612, 617; 701/101–103, 110–113, 115, 114, 116; 73/117.3, 73/489, 514.39, 116, 488; 324/207.2
See application file for complete search history.

(56) References Cited

U.S. PATENT DOCUMENTS 3,923,022 A * 12/1975 Scholl ................... 123/406.59
4,298,941 A * 11/1981 Furuhashi ................... 701/102
4,527,248 A * 7/1985 Takase et al. ............... 701/102
5,295,471 A * 3/1994 Ridgway et al. ............ 123/479
6,793,059 B1 * 9/2004 Okada et al. ............ 123/179.4
6,834,632 B1 * 12/2004 Kataoka et al. .......... 123/179.4

FOREIGN PATENT DOCUMENTS

DE 199 00 641 1/2000

* cited by examiner

*Primary Examiner*—Willis R. Wolfe, Jr.
(74) *Attorney, Agent, or Firm*—Kenyon & Kenyon

(57) ABSTRACT

A method for determining the angle-of-rotation position of a shaft of an internal combustion engine, particularly of a crankshaft, information regarding at least incremental angles of rotation of the shaft and run times for each incremental angle of rotation being registered and stored at least temporarily, the angle-of-rotation position being determined on the basis of information regarding already stored incremental angles of rotation and run times in the event of an absence of information regarding incremental angles of rotation. In addition, the use of a double Hall sensor for registering information in implementing the method, a device for determining the angle-of-rotation position of a shaft of an internal combustion engine, as well as an automatic start-stop system for a motor vehicle.

15 Claims, 2 Drawing Sheets

METHOD FOR DETERMINING THE ANGLE-OF-ROTATION POSITION OF A SHAFT

FIELD OF THE INVENTION

The present invention relates to a method for determining the angle-of-rotation position of a shaft of an internal combustion engine, particularly of a crankshaft, information regarding at least the incremental angles of rotation of the shaft and the run times for each incremental angle of rotation being registered and at least temporarily stored. Furthermore, the present invention relates to the use of a double Hall sensor, a device for determining the angle-of-rotation position of a shaft as well as an automatic start-stop system for a motor vehicle.

BACKGROUND INFORMATION

Methods for determining the angle-of-rotation position of a shaft of an internal combustion engine are known. Particularly in the case of a crankshaft, the determination of the angle-of-rotation position is of great importance since important processes in the operation of the internal combustion engine, for example fuel injection or the generation of an ignition spark, are usually individually controlled for each cylinder as a function of the crankshaft angle. For determining the angle of rotation, it is known, for example, to arrange incremental sensors on the crankshaft and/or camshaft. These are normally sensor disks or sensor wheels having incremental markers which in interaction with a sensor arranged in a stationary mount with respect to the engine block allow for the angle-of-rotation position of the crankshaft to be determined. These incremental markers on the sensor disk often take the form of a series of teeth and tooth interstices, and the transitions between tooth and interstice or between interstice and tooth, that is the tooth faces, are detected by a sensor. Known in this respect is also the creation of an enlarged tooth interstice, a so-called gap, by eliminating at least one tooth, with the aid of which the absolute angle of the shaft can be ascertained while the engine is rotating.

The knowledge of the angle-of-rotation position can also be used advantageously for improvements in a restart of the internal combustion engine. If the angle-of-rotation position is already immediately known when the engine is started—and not only after determining the absolute angle with the aid of the gap—then the restart of the engine can be significantly accelerated, with positive effects on comfort and exhaust gas emissions. Particularly in the case of motor vehicles that have an automatic start-stop system, optimal engine restarts are very important. An automatic start-stop system is normally used for fuel saving purposes, the internal combustion engine being switched off if there is no power requirement (for example when coasting or stopping) and the engine being automatically turned on again if it is to supply power (for example when driving off again). Since in this context the engine is regularly restarted, the precise knowledge of the angle-of-rotation position has a significant advantage in the operational management of the internal combustion engine.

An added difficulty in determining the angle-of-rotation position is the fact that normally the engine oscillates when it is turned off, that is, there are alternating movements in both directions of rotation until the engine comes to a standstill. This oscillation primarily arises when the inertia of the engine is no longer sufficient to move the piston in a cylinder against the pressure building up in the cylinder and across the top dead center. The pressure in the cylinder pushes the piston back, thereby changing the engine's direction of rotation, until a counterpressure has built up in another cylinder, which again changes the direction of rotation, or until the engine comes to a final standstill. Simple sensors at the crankshaft are unable to register the direction of rotation and are hence also unable to detect an oscillating movement of the engine.

As a solution, the related art, for example German Patent No. DE 199 00 641, provides an absolute angle sensor at the camshaft, with which the absolute position of the crankshaft can be inferred at any time. Disadvantageous in this regard, however, are the higher costs and the increased space requirement as well as the complex signal processing. In addition, tolerances in the toothed belt can result in deviations between the crankshaft position expected on the basis of the camshaft position and the actual crankshaft position. Another solution is the arrangement of two sensors that are offset by an angle difference of a "multiple of a tooth plus half a tooth". Disadvantages, however, are the additionally required space, the costs for integrating the second sensor as well as the required narrow tolerances between the two sensors and the sensor wheel.

The systems according to the related art have the common feature that they are able to ascertain the angle-of-rotation position only by detecting tooth faces. This is disadvantageous particularly if, while the engine is decelerated, the sensor detects the beginning of the gap, yet the engine comes to a standstill before the gap has been traversed. Hence there is now uncertainty as to what extent the gap has been traversed and thus what angle-of-rotation position the shaft finally assumed.

SUMMARY OF THE INVENTION

The present invention develops the method for determining the angle-of-rotation position according to the related art further in the sense that, in the absence of information regarding incremental angles of rotation, the angle-of-rotation position is determined on the basis of information on previously stored incremental angles of rotation and run times. First, during the operation of the internal combustion engine, the incremental angles of rotation of the shaft and the run times for every incremental angle of rotation are detected. Incremental angle of rotation here means that a rotation of the shaft around a specific relative angle of rotation can be inferred from a defined signal or a defined signal sequence. If a sensor wheel having teeth and corresponding tooth interstices is used for example as well as an evaluation unit that detects the individual tooth faces, then each signal means that the shaft has turned by one incremental angle of rotation corresponding to the angle of a tooth or of a tooth interstice. Furthermore, the time in which the incremental angle was traversed is ascertained. This run time is normally ascertained as the difference between two signals, that is, from the end of a traversed incremental angle of rotation until the end of the subsequent incremental angle of rotation. These measurements of the run times may be used for example to ascertain the gap: If there is a significantly extended run time in a regular sequence of nearly identical run times, this allows for the inference that the gap of the sensor wheel has run past the sensor device. Since beginning and end of the gap are assigned to a fixed absolute angle, the detection of the gap allows for an inference to the absolute angle-of-rotation position of the shaft. The information regarding at least incremental angles of rotation of the shaft and the associated run times are stored at least temporarily.

If the engine is decelerated to a standstill, this always results in the state in which the sensor wheel comes to rest with one tooth, with one tooth interstice or with the gap opposite of the sensor.

Thus the sensor has detected the arrival at a tooth or the entry into a tooth interstice/the gap but not the departure from the tooth or from the tooth interstice/the gap. Hence there is uncertainty as to where the sensor wheel and therefore the crankshaft has come to a standstill. Particularly a standstill in the gap results in a wide range of possible angle-of-rotation positions.

It is now possible to improve the precision of the angle-of-rotation position in that the angle-of-rotation position is determined with the aid of information regarding previously stored incremental angles of rotation and run times. Since the rotation of the shaft, even if there is a change of the direction of rotation during this rotation, is a continuous motion, the last information ascertained regarding the rotation of the shaft allows for the angle-of-rotation position assumed by the shaft at standstill to be determined. Depending on what method was used for making this determination and with what precision the characteristic of the shaft rotation is known, particularly during a braking process of the internal combustion engine, the angle-of-rotation position at standstill may be calculated or estimated.

Within the scope of this application, the incremental angle of rotation is to be understood as a quantity bearing an algebraic sign, that is, the magnitude of the incremental angle of rotation indicates the angle by which the crankshaft has rotated and the sign of the incremental angle of rotation contains the information as to the direction—clockwise or counterclockwise—in which the rotation occurred. In principle, however, it is also possible to process incremental angles of rotation that do not have information about the direction of rotation contained within them.

Advantageously, in the absence of information regarding incremental angles of rotation, the angle-of-rotation position is determined by an extrapolation. This is based on the realization that the attenuation of the engine movement, and hence of the rotation of the shaft can be described or approximated by a mathematical function. On the basis of a function, assumed for the attenuation, and supporting values, which are selected from the previously ascertained incremental angles of rotation and run times, it is thus possible to calculate or estimate the continued rotation of the shaft. In the most simple case, a linear functional relationship may be assumed, but any other functional relationship may be used as well, for example logarithmic relationships or relationships on the basis of a polynomial. Normally, the last two or three stored items of information regarding incremental angles of rotation and run times are used as supporting values. More values may also be used in the extrapolation, however, possibly even values that do not follow one another directly In an advantageous refinement of the present invention, the angle-of-rotation position of a shaft is determined in normal operation and/or in the deceleration of the shaft to a standstill. The method may be used in normal operation of the internal combustion engine to determine the angle-of-rotation position of the shaft between two tooth face signals. It may likewise be used in a deceleration of the shaft as well as—as already described above—to ascertain the position of the shaft at rest after the last tooth face signal was received prior to standstill.

From every item of information regarding an incremental angle of rotation and from the associated run time, an angular velocity is advantageously calculated. If corresponding angular velocities are calculated, then the deceleration of the shaft may be ascertained by comparing the angular velocities that normally follow one another directly. If the ascertained run times are in each case based on same incremental angle of rotation, then a comparison of the run times will also lead to a statement regarding the deceleration process. Alternatively, items of information may be compared to one another by calculating a run time per constantly chosen angle.

It is advantageous if an attenuation measure for the deceleration of the shaft is ascertained from the quotient of two calculated angular velocities. With this it is possible to determine the measure at which the rotation of the shaft decelerates.

In a preferred specific embodiment, experimentally ascertained measured values regarding the operational behavior of the shaft are taken into account in determining the angle-of-rotation position. Since in the real-world application the attenuation of the rotation of the shaft when switching off the internal combustion engine depends on many parameters that are difficult to determine or estimate on the basis of theoretical considerations alone, the provided determination of the angle-of-rotation position can be improved by including experimentally ascertained measured values. Thus, for example, the actual deceleration process of the shaft may be influenced by the operating temperature of the internal combustion engine or by the angle-of-rotation position of the shaft at which the internal combustion engine is switched off. With knowledge of experimentally ascertained measured values, these influences may be taken into account, thereby improving the quality of the determination of the angle-of-rotation position.

Advantageously, these measured values are attenuation values that characterize the deceleration process of the shaft at the end of the active operation of the internal combustion engine. Since the characteristic of the attenuation arising in the deceleration of the shaft has a significant influence on the final angle-of-rotation position, substantial improvements in determining the angle-of-rotation position can be achieved when experimentally ascertained attenuation values are taken into account.

Advantageously, at least once an absolute value is ascertained for the angle-of-rotation position. On this basis the incremental angles of rotation are then added or subtracted depending on the direction of rotation. Advantageously, an absolute value for the angle-of-rotation position is determined at regular intervals, in particular once per revolution of the shaft.

In an advantageous refinement, the incremental angles of rotation are detected by a sensor system at a sensor disk attached to the shaft. This type of detection is cost-effective and easily implemented. The sensor disks or sensor wheels are known from the related art in many specific embodiments and will therefore not be explained in more detail. It should merely be pointed out that a sensor wheel having—viewed in the circumferential direction—teeth and teeth interstices of equal sizes, particularly if a gap for determining the absolute angle of rotation is provided by leaving out at least one tooth, preferably two teeth.

The present invention further relates to the use of a double Hall sensor for registering information in the implementation of a previously described method. Normally two Hall elements are arranged side by side on this type of sensor. Since, due to the manufacturing process, the two elements are very precisely aligned with respect to each other, a very high precision may be achieved in which the tolerance of the mechanical tooth faces with respect to each other becomes insignificant. This additionally results in cost savings as compared to separately implemented sensors. Such a double Hall sensor makes it easy to register information regarding incremental angles of rotation, including information regarding the direction of rotation.

The present invention also relates to a device for determining the angle-of-rotation position of a shaft of an internal combustion engine, particularly of a crankshaft, having at least one sensor registering information regarding at least incremental angles of rotation of the shaft and run times for every incremental angle of rotation and a memory storing the incremental angles of rotation and run times at least temporarily, having a logic circuit capable of being activated or automatically activating in the event of an absence of information regarding incremental angles of rotation and calculating an angle-of-rotation position from previously stored incremental angles of rotation and run times.

Finally, the present invention relates to an automatic start-stop system for a motor vehicle having a shaft of an internal combustion engine, particularly a crankshaft, the angle-of-rotation position being determined by a previously described method and/or by a previously described device.

DETAILED DESCRIPTION

Figure 1:
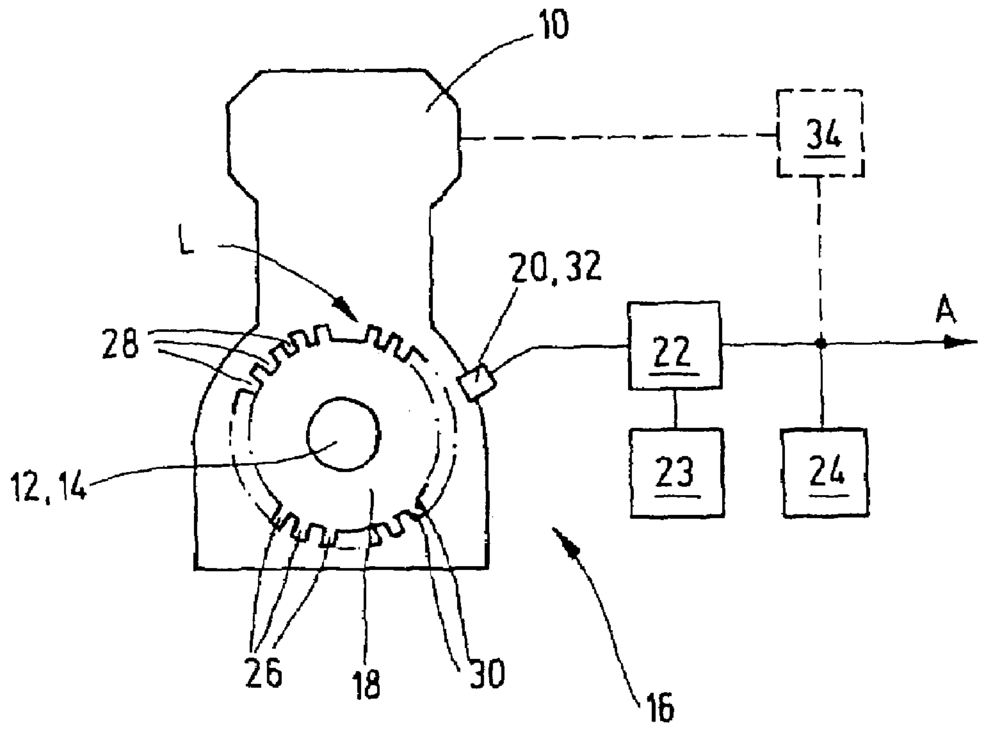
FIG. 1 shows an exemplary embodiment of a device for determining the angle-of-rotation position of a shaft of an internal combustion engine.

FIG. 1 is a symbolic representation of an internal combustion engine 10 having a shaft 12, here taking the form of a crankshaft 14. Internal combustion engine 10 is assigned a device 16 for determining the angle-of-rotation position of crankshaft 14, featuring a sensor wheel 18, a sensor 20, an evaluation unit 22, a memory 23 and a logic circuit 24. Sensor wheel 18 is attached to crankshaft 14 in a rotationally fixed manner such that in the operation of internal combustion engine 10 it rotates relative to internal combustion engine 10. Teeth 26 having an angular width of 3° are located at the periphery of sensor wheel 18, two teeth being separated from each other by an interstice having an angular width of 3°. In a section of the periphery, two adjacent teeth 26 are not formed, creating an enlarged tooth interstice, namely gap L. At each transition between a tooth 26 and a tooth interstice, 28 or gap L, a tooth face 30 is formed.

Sensor 20 is configured as a double Hall sensor 32 and is arranged in a stationary mount with respect to internal combustion engine 10. Sensor 20 detects the sequence of teeth 26 and tooth interstices 28 or gap L running by and generates an incremental angle of rotation signal bearing an algebraic sign. In this exemplary embodiment, the direction of rotation is contained in such a way that in a clockwise direction of rotation of sensor wheel 18 positive incremental angles of rotation are signaled, while negative incremental angles of rotation are signaled in the case of a counterclockwise rotation. The signals of sensor 20 are forwarded to evaluation unit 22. Here the angle-of-rotation position of shaft 12 is determined on the basis of the incoming signals. The angle-of-rotation positions ascertained in this manner are forwarded to output A, where the angle-of-rotation position may be queried for example by an engine control unit of internal combustion engine 10. At the same time, evaluation unit 22 forwards information regarding incremental angles of rotation and the associated run times to memory 23. Here the items of information are stored chronologically, it being sufficient to store only a certain number of the most recently ascertained items of information. This may be implemented for example by a ring buffer, which has a specific number of memory locations such that the oldest item of information is always overwritten by the latest item of information in a continuous sequence.

In the absence of information regarding incremental angles of rotation and run times, logic circuit 24 is activated, which accesses memory 23 and determines the probable angle-of-rotation position of shaft 12 by extrapolation of the most recently ascertained items of information on the basis of the angle-of-rotation position most recently ascertained by evaluation unit 22. In this way, information regarding the angle-of-rotation position of shaft 12 is secured, even if evaluation device 22 is not able to ascertain an updated angle-of-rotation position. In this exemplary embodiment, logic circuit 24 evaluates the three most recently ascertained tooth times t1, t2 and t3, that is, the times that lie between the detection of tooth faces 30. Two quotients are determined from these values: k1=t1/t2 and k2=t2/t3. In logic circuit 24, additionally at least one value table of experimentally ascertained measured values is stored, which provides information as to which differential angle of rotation—that is, the angle that lies between the final reliably determined angle-of-rotation position and the currently existing angle-of-rotation position—is to be expected as a function of the attenuation values k1 and k2. On this basis it is possible precisely to determine or calculate the probable angle-of-rotation position of the shaft.

In FIG. 1, dashed lines indicate an automatic start-stop sytem 34 for a motor vehicle having internal combustion engine 10, which is connected to internal combustion engine 10, or to its engine electronics, and receives values regarding the angle-of-rotation position of crankshaft 14 from device 16. On the basis of the precise values regarding the angle-of-rotation position, internal combustion engine 10 may be started in start-stop operation in a manner that is comfortable and low in emissions.

Figure 2:
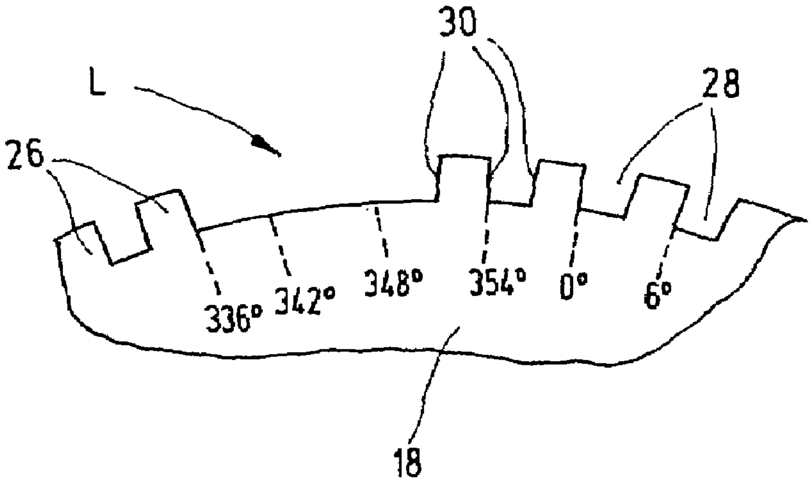
FIG. 2 shows an exemplary embodiment of a sensor wheel for determining the angle-of-rotation position.

FIG. 2 shows a detail of sensor wheel 18 to show clearly that on the basis of gap L and individual teeth 26 or tooth faces 30 it is possible to assign an absolute angle to the angle-of-rotation position.

Figure 3:
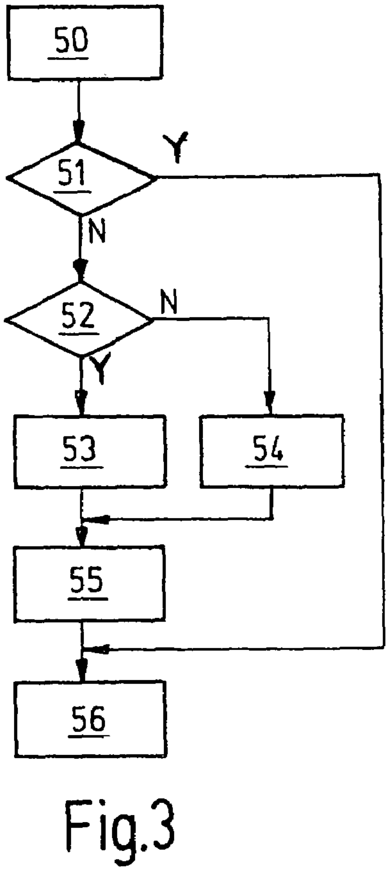
FIG. 3 shows a flow chart for a method for processing the tooth face signals.

FIG. 3 shows a flow chart for a method for processing the tooth face signals. Step 50 represents the beginning of the sequence, when sensor 20 has detected a tooth face 30. First a verification is performed in step 51 as to whether sensor 20 is above gap L. If this is the case (branch J), then all subsequently described steps are skipped since the correct handling of gap L must be considered in a separate procedure. If gap L is not at sensor 20, then the direction of rotation of the sensor wheel 18 is evaluated in step 52. If sensor wheel 18 is rotating counterclockwise (left-hand rotation) (branch J), then a positive incremental angle of rotation is established corresponding to the width of a tooth 26 or a tooth interstice 28, that is 3°, while in the case of a clockwise rotation (branch N) a negative incremental angle of rotation is established, the magnitude of which is again 3°. In step 55, the ascertained incremental angle of rotation is added to the most recently ascertained absolute angle-of-rotation position. The method ends with step 56. It should be pointed out that, at a calculated angle-of-rotation position greater than 360°, a value of 360° is subtracted and, in the case of an angle-of-rotation position smaller than 0°, a value of 360° is added.

Figure 4:
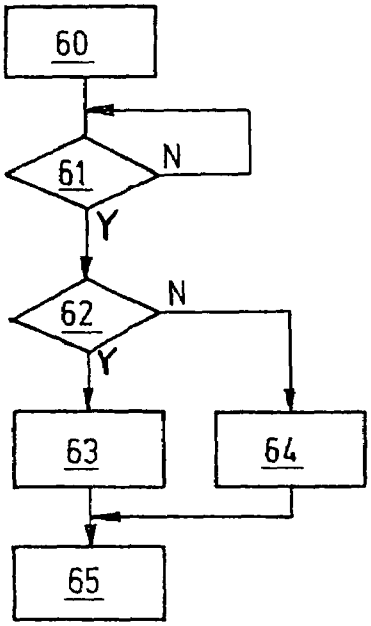
FIG. 4 shows a flow chart for a method for processing a gap of the sensor wheel.

FIG. 4 shows a flow chart for a method for processing a gap of sensor wheel 18. Step 60 symbolizes the start of the method. In step 61, first a verification is performed as to whether a gap L was detected. This is done according to a method for determining gaps known from the related art, for example by comparing three consecutive tooth times. Only when a gap has been detected (branch Y), does the method proceed with step 62. If there is a left-hand rotation (branch Y), then the absolute angle is set to 0° following the detection of the second falling tooth face, while in the case of a right-hand rotation (branch N) the absolute angle at the second rising face is set to 330°. After the absolute angle has been set, the method ends with step 65, but may immediately be restarted if necessary.

Figure 5:
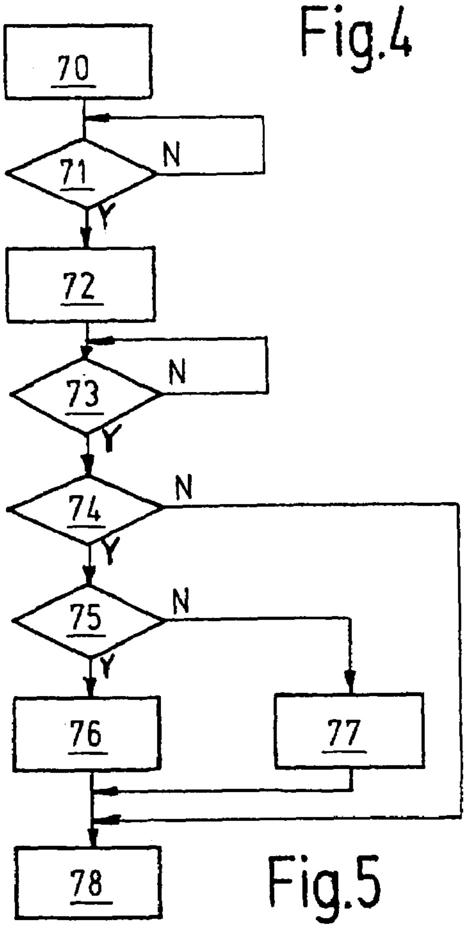
FIG. 5 shows a flow chart for an improved method for the correct processing of the gap of a sensor wheel while taking a change of the direction of rotation into account.

FIG. 5 shows a flow chart for an improved method for correctly processing gap L of a sensor wheel 18, particularly of sensor wheel 18 shown in FIGS. 1 and 2, while taking into account a change in the direction of rotation. The start of the method is represented by step 70. In step 71, a verification is performed as to whether a beginning of gap L was detected. If this is not the case (branch N), then the method is not continued. If a beginning of gap L is detected (branch Y), then in step 72 the direction of rotation ascertained when the gap is entered is stored in a first variable. Subsequently, a verification is performed in step 73 as to whether the end of gap L was reached. If this is not the case (branch N), the subsequent step is not yet initiated. If the end of gap L was detected (branch Y), then the direction of rotation ascertained when exiting the gap is ascertained and stored in a second variable. In step 74, a verification is then performed as to whether the first and the second variables agree, that is to say, whether the directions of rotation ascertained when entering the gap and when exiting the gap are the same. If this is the case, then no change of direction of rotation occurred within gap L such that the previously described gap detection can function properly. If, on the other hand, a change in the direction of rotation has occurred (branch Y), then it is now necessary to set the correct absolute angle when leaving the gap. To this end, first a verification is performed in step 75 as to whether when leaving the gap there was a counterclockwise rotation. If this is the case (branch Y), then this allows for the inference that the gap exit occurs at 351°. Accordingly, in step 76 the absolute value is set to 351°. If there was a right-hand rotation (branch N), then the end of gap L must have been at 336° such that in step 77 the absolute angle is set accordingly. The method ends with step 78.

What is claimed is:

1. A device for determining an angle-of-rotation position of a shaft of an internal combustion engine, the device comprising:

at least one sensor registering information regarding at least incremental angles of rotation of the shaft and run times for every incremental angle of rotation;

a memory storing the incremental angles of rotation and run times at least temporarily; and a logic circuit configured to be activated in the event of an absence of information regarding incremental angles of rotation, and calculate the angle-of-rotation position from previously stored incremental angles of rotation and run times.

2. The device according to claim 1, wherein the shaft is a crankshaft.

3. An automatic start-stop system for a motor vehicle having a shaft of an internal combustion engine, the automatic start-stop system comprising a device for determining an angle-of-rotation position of the shaft, the device including:

at least one sensor registering information regarding at least incremental angles of rotation of the shaft and run times for every incremental angle of rotation;

a memory storing the incremental angles of rotation and run times at least temporarily; and a logic circuit configured to be activated in the event of an absence of information regarding incremental angles of rotation, and calculate the angle-of-rotation position from previously stored incremental angles of rotation and run times.

4. The automatic start-stop system according to claim 3, wherein the shaft is a crankshaft.

5. A method for determining an angle-of-rotation position of a shaft of an internal combustion engine, the method comprising:

registering and storing at least temporarily information regarding at least incremental angles of rotation of the shaft and run times for each of the incremental angles of rotation; and in the event of an absence of information regarding incremental angles of rotation, determining the angle-of-rotation position as a function of information regarding already stored incremental angles of rotation and run times.

6. The method according to claim 1, wherein the shaft is a crankshaft.

7. The method according to claim 1, wherein the angle-of-rotation position of the shaft is determined in at least one of a normal operation and a deceleration of the shaft to a standstill.

8. The method according to claim 1, further comprising, from every item of information regarding an incremental angle of rotation and an associated run time, calculating an angular velocity.

9. The method according to claim 1, further comprising ascertaining at least once an absolute value for the angle-of-rotation position.

10. The method according to claim 1, further comprising detecting incremental angles of rotation by a sensor system at a sensor disk attached to the shaft.

11. The method according to claim 1, wherein the information is registered using a double Hall sensor.

12. The method according to claim 1, wherein, in the absence of information regarding incremental angles of rotation, the angle-of-rotation position is determined by an extrapolation.

13. The method according to claim 12, further comprising ascertaining an attenuation measure for a deceleration of the shaft from a quotient of two calculated angular velocities.

14. The method according to claim 1, wherein experimentally ascertained measured values regarding an operational behavior of the shaft are taken into account in determining the angle-of-rotation position.

15. The method according to claim 14, wherein the measured values are attenuation values that characterize a deceleration process of the shaft at an end of an active operation of the internal combustion engine.

* * * * *